United States Patent
Morales Serrano et al.

(10) Patent No.: US 6,396,192 B2
(45) Date of Patent: May 28, 2002

(54) ELECTRICAL CIRCUIT FOR THE CONTROL OF PIEZOELECTRIC DRIVES

(75) Inventors: Francisco J. Morales Serrano, Aachen; Christian Reichinger, Alsdorf, both of (DE)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/790,200

(22) Filed: Feb. 22, 2001

(30) Foreign Application Priority Data

Feb. 25, 2000 (DE) .......................... 100 08 937

(51) Int. Cl.[7] .............................. H02N 2/00; H02N 2/14
(52) U.S. Cl. ................................. 310/316.01
(58) Field of Search .................. 310/316.01, 316.02, 310/317

(56) References Cited

U.S. PATENT DOCUMENTS

| | | | |
|---|---|---|---|
| 4,713,571 A | * 12/1987 | Suzuki et al. | 310/316.01 |
| 4,794,294 A | * 12/1988 | Shimizu et al. | 310/316.01 |
| 4,833,358 A | * 5/1989 | Suzuki et al. | 310/316.01 |
| 4,879,528 A | * 11/1989 | Gotanda | 331/4 |
| 5,013,982 A | 5/1991 | Sasaki | 318/114 |
| 5,113,116 A | * 5/1992 | Wilson | 310/316.01 |
| 5,130,619 A | * 7/1992 | Izuno | 318/116 |
| 5,159,223 A | * 10/1992 | Suganuma | 310/316.01 |
| 5,233,274 A | * 8/1993 | Honda et al. | 310/316.01 |
| 5,508,579 A | * 4/1996 | Suganuma | 310/316.01 |
| 5,563,478 A | * 10/1996 | Suganuma | 318/116 |
| 5,588,592 A | * 12/1996 | Wilson | 239/4 |
| 6,005,328 A | * 12/1999 | Suganuma | 310/316.01 |

* cited by examiner

*Primary Examiner*—Thomas M. Dougherty
(74) *Attorney, Agent, or Firm*—Ernestine C. Bartlett

(57) ABSTRACT

The invention relates to a circuit for the control of a piezoelectric drive (1).

Figure 1:
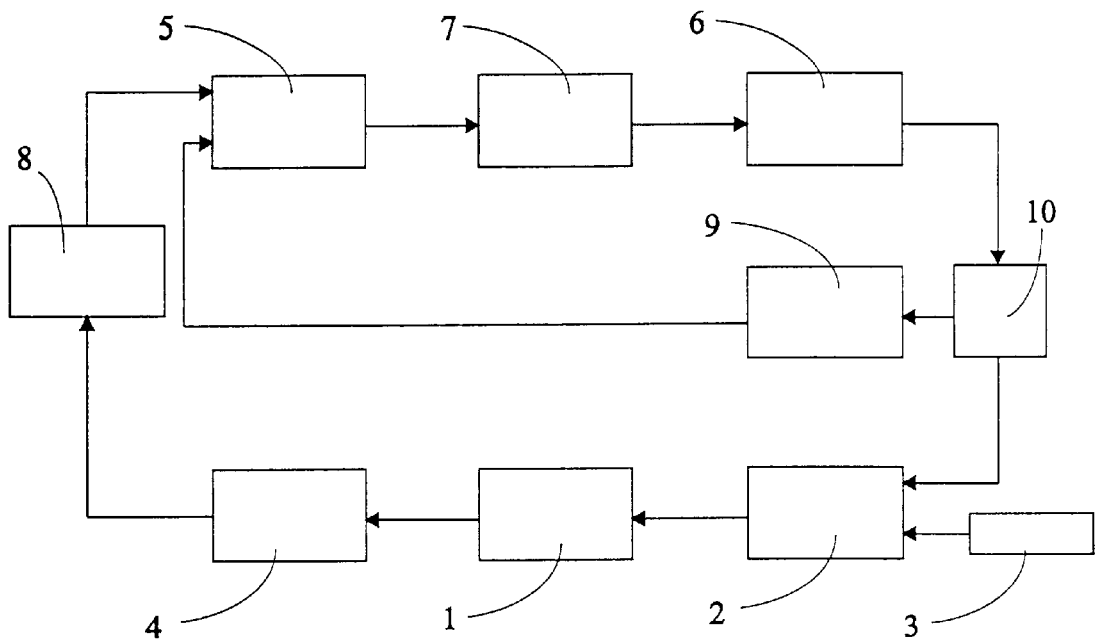

An output signal of a first measurement circuit (4) is applied to a first input of a phase detector (5), an output signal of a logic circuit (10) or an output signal of a second measurement circuit (13) is applied to a second input of the phase detector (5), a second output signal of the logic circuit (10) is applied as an input signal to a final stage (2) which serves to supply an alternating voltage to the piezoelectric drive (1), a loop filter (7) processes the output signal of the phase detector (5) and supplies a control signal to a voltage-controlled oscillator (6), whose output signal is supplied to the input of the logic circuit (10), and a delay element (8) has been provided to adjust the frequency of the optimum operating point and efficiency of the controlled piezoelectric drive (1).

11 Claims, 3 Drawing Sheets

ELECTRICAL CIRCUIT FOR THE CONTROL OF PIEZOELECTRIC DRIVES

The invention relates to a circuit for the control of a piezoelectric drive.

For the operation of piezoelectric drives an alternating voltage of a given frequency is required. This frequency should excite the desired resonant mode of the piezoelectric drive. The optimum operating frequency is then situated near the mechanical resonant frequency of the piezoelectric drive. Such an electrical circuit for the control of piezoelectric drives is described in the patent specification U.S. Pat. No. 5,013,982. Said specification relates to a piezoelectric drive, particularly a travelling wave motor to which two alternating voltages are applied. The electrical circuit that is used serves to control the frequency and the phase angle of the drive voltage of the piezoelectric drive. Thus, the speed of the drive is controlled.

It is an object of the invention to control a piezoelectric drive by means of an electrical circuit in such a manner that the optimum operating point and, consequently, the maximal efficiency of the piezoelectric drive are obtained independently of varying parameters such as temperature and load of the piezoelectric drive, so as to improve the efficiency of the piezoelectric drive. At the same time, a cheap and simple to realize electrical circuit for the control of the piezoelectric drive is to be provided, which circuit can readily be adapted to different piezoelectric drives.

According to the invention, the object is achieved in that an output signal of a first measurement circuit is applied to a first input of a phase detector, an output signal of a logic circuit or an output signal of a second measurement circuit is applied to a second input of the phase detector, a second output signal of the logic circuit is applied as an input signal to a final stage which serves to supply an alternating voltage to the piezoelectric drive, a loop filter processes the output signal of the phase detector and supplies a control signal to a voltage-controlled oscillator, whose output signal is supplied to the input of the logic circuit, and a delay element has been provided to adjust the frequency of the optimum operating point and efficiency of the controlled piezoelectric drive.

As a result of this, it is achieved that the piezoelectric drive always operates with maximal efficiency throughout its lifetime. For a given output power this saves electric energy and reduces the overall volume. Moreover, an improved efficiency leads to a reduced power dissipation, as a result of which the life of the piezoelectric drive is prolonged.

Furthermore, a measurement circuit is provided wherein the voltage is detected in the measurement circuit (4) by means of a sensor electrode (14) on the piezoelectric drive (1) and is the first input signal of the phase detector (5). This measurement circuit enables the phase zero crossings and thus the phase relationship of the voltage on a sensor electrode on the piezoelectric resonator to be detected.

As an alternative, a measurement circuit is provided wherein in the measurement circuit (4), the current of the piezoelectric drive (1) flows through a measurement impedance (12) and the amplified voltage across the measurement impedance is the first input signal of the phase detector (5). This measurement circuit enables the phase zero crossings and thus the phase relationship of the current through piezoelectric drive to be detected in another manner.

In another embodiment, in the measurement circuit (4), the current of the piezoelectric drive (1) flows through a zener diode (11) and the voltage across the zener diode (11) is the first input signal of the phase detector (5). This has the advantage of a cheaper yet reliable detection of the phase relationship of the current through the piezoelectric drive. This makes it possible to dispense with the operational amplifier required in the earlier described embodiment.

As an alternative, the embodiment may be one in which in the measurement circuit (4), the current of the piezoelectric drive (1) flows through two diodes (15) arranged in anti-parallel and the amplified voltage across the diodes (15) is the first input signal of the phase detector (5). This also enables the phase relationship of the current through the piezoelectric drive to be detected by means of two anti-parallel diodes.

An embodiment may also be provided in which in the form of the second measurement circuit, (13) the voltage applied to the piezoelectric drive (1) is measured. This measurement circuit enables the phase zero crossings and thus the phase relationship of the voltage applied to the piezoelectric drive to be detected.

The alternative embodiments in which the delay element (8) delays the output signal of the measurement circuit (4) or in which the delay elements (8) delays the output signal of the logic circuit (1) in the branch between the logic circuit (10) and the second input of the phase detector (5), or the output signal of the measurement circuit (13) make it possible to preset the control circuit to a given operating point as regards the resonant frequency of the piezoelectric drive (frequency offset). Both forms of a built-in delay are technically equivalent. The delay element provides the adjustment of the optimum operating point, which is situated at a frequency slightly offset with respect to the resonant frequency of the piezoelectric drive. The position of the resonant frequency of the piezoelectric drive can be found with the aid of the position of the phase zero crossing of the voltage of the first measurement circuit with respect to the position of the phase zero crossing of the output voltage of the logic circuit or the position of the phase zero crossing of the voltage applied to the piezoelectric drive. The phase difference between the two signals used for the detection of the resonant frequency of the piezoelectric drive can be shifted depending on the dead time of the delay element.

In a further embodiment, a frequency divider is arranged in the branch between the logic circuit and the phase detector. This frequency divider divides the one output signal of the logic circuit by a natural number. This has the advantage that the excitation frequency of the final stage can be several times as high as the operating frequency of the control circuit, which reduces losses as a result of distortion of harmonic waves in the final stage.

The electrical circuit in accordance with any of the embodiments just described is included in an electric shaver in order to control the piezoelectric drive of the cutters.

In a compact electrical appliance the positive effects of a high efficiency are particularly manifest because an efficient drive enables a small overall volume to be obtained. Moreover, the reduced electric power drain reduces the current consumption, which is particularly important in the case of battery-powered shavers because this permits longer mains-independent shaving or it allows the capacity of the battery and, consequently, the weight to be reduced.

Figure 2:
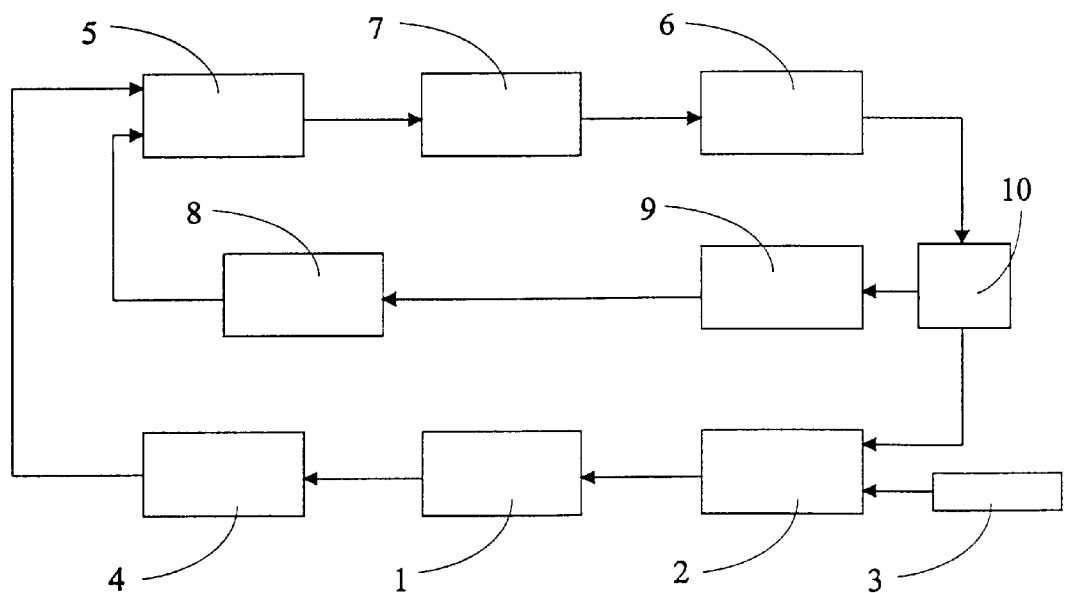
Figure 3:
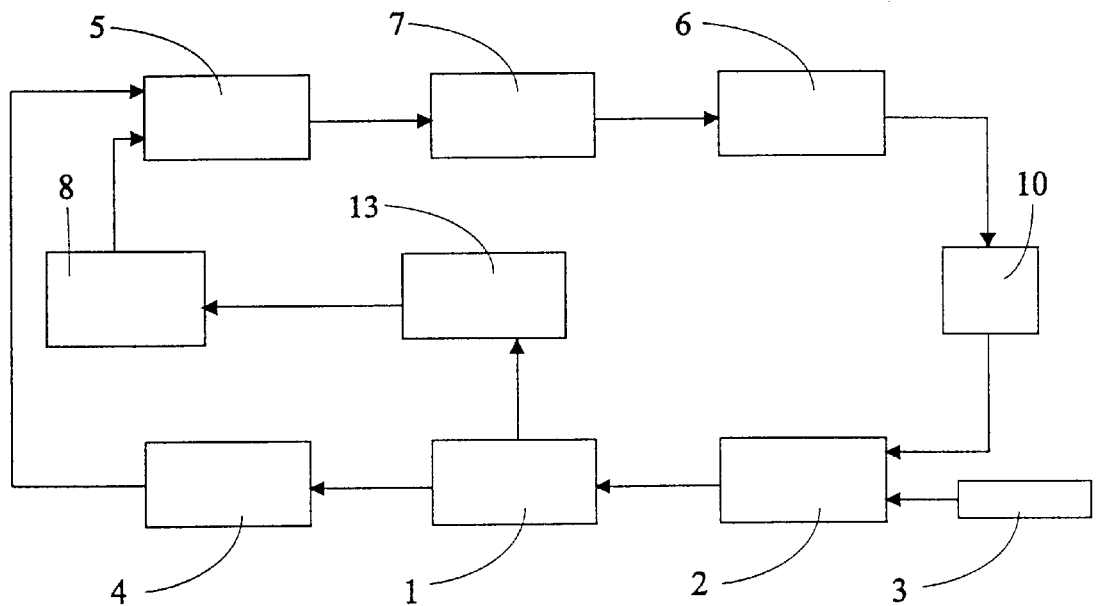
Figure 4:
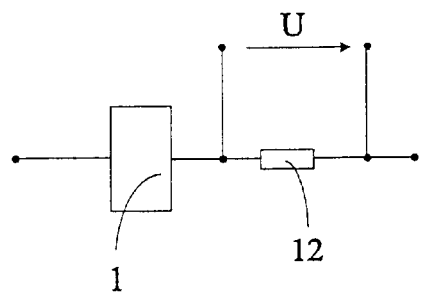
Figure 5:
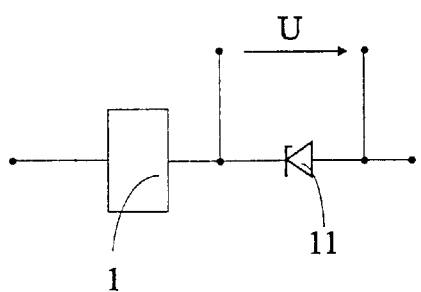
Figure 6:
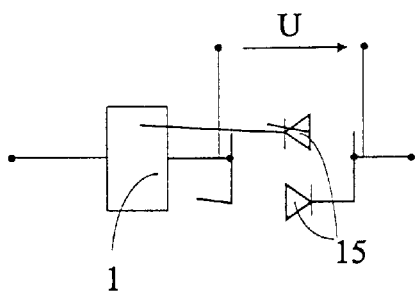
Figure 7:
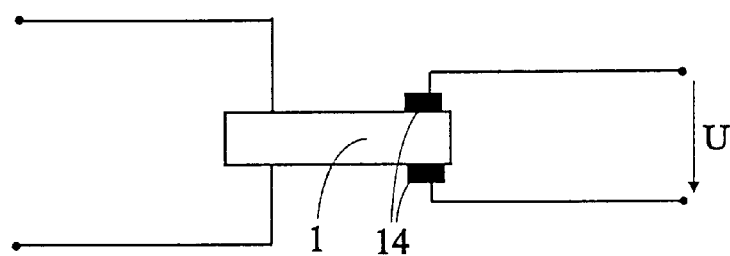
Figure 8:
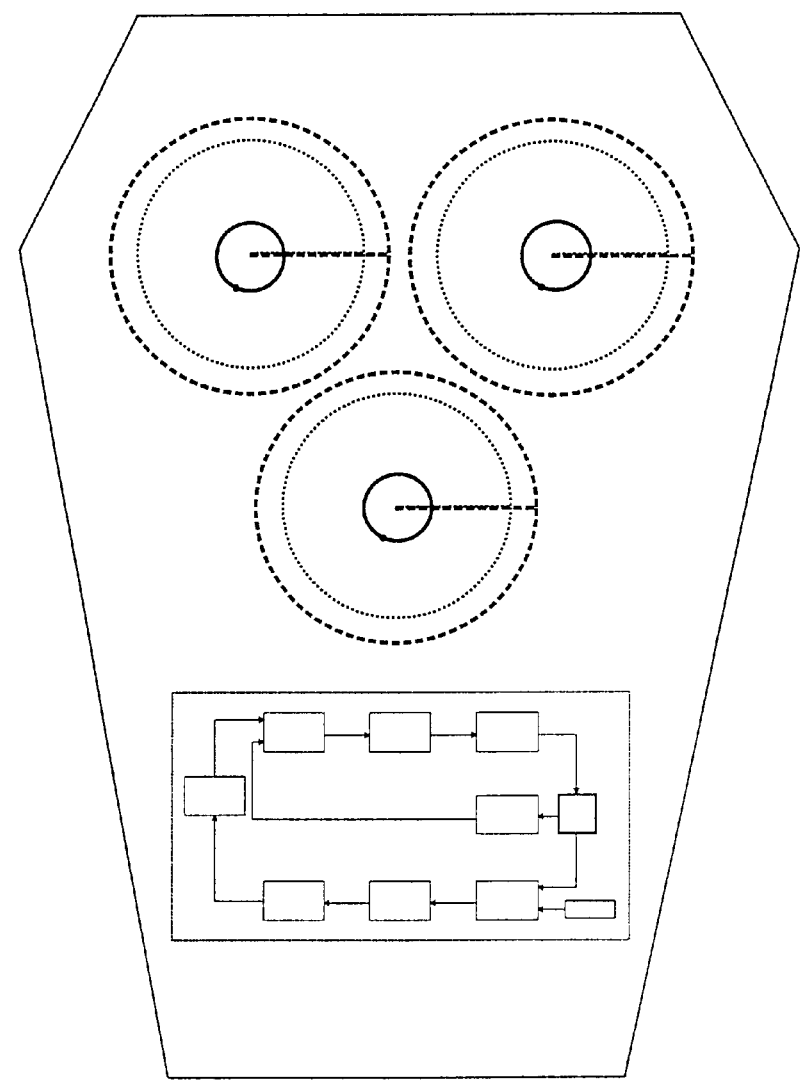

Several embodiments of the invention will be described by way of example with reference to eight Figures. In the drawings:

FIG. 1 is a block diagram of a first circuit for controlling a piezoelectric drive, FIG. 2 is a block diagram of a second circuit for controlling a piezoelectric drive, FIG. 3 is a block diagram of a third circuit for controlling a piezoelectric drive, FIG. 4 is a circuit diagram of a first measurement circuit for detecting the phase of the current through the piezoelectric drive, FIG. 5 is a circuit diagram of a second measurement circuit for detecting the phase of the current through the piezoelectric drive, FIG. 6 is a circuit diagram of a third measurement circuit for detecting the phase of the current through the piezoelectric drive, FIG. 7 is a circuit diagram of a fourth measurement circuit with sensors in the piezoelectric drive, FIG. 8 is a diagrammatic view of an electric shaver including circuit in accordance with the invention.

The circuit in FIG. 1 and the circuit in FIG. 2 have the same circuit elements and differ only as regards their circuit arrangement. The circuit shown in FIG. 3 also controls the operation of a piezoelectric drive 1.

Basically, the piezoelectric drive 1 is supplied with the necessary voltage and electric power by a final stage 2, the final stage 2 being powered by a direct voltage source 3, such as for example a battery or an accumulator battery. The circuits further include a measurement circuit 4 for the detection of the phase of the current through the piezoelectric drive 1 or for the detection of the phase of a measurement voltage on a special sensor electrode 14 on the piezoelectric drive 1 as is shown in FIG. 7. On the surface of the piezoelectric drive 1 electrodes 14 are disposed, which electrodes supply a voltage. This voltage is prepared for the control circuit by means of an operational amplifier, not shown.

The situation in the case of current detection is not shown in the measurement circuit in FIGS. 4 to 6. The measurement impedance 12 is arranged in series with the piezoelectric drive 1. Since the measurement impedance 12 should be very low in order to preclude electrical losses, the voltage across the measurement impedance 12 is amplified in an operational amplifier, not shown, and is applied to an input of the phase detector 5. The second measurement circuit of FIG. 5 includes a zener diode 11, which is arranged in series with the piezoelectric drive 1. Since the diode 11 conducts only starting from a given value of the applied voltage, this also enables the phase zero crossings to be determined. The voltage across the zener diode 11 is also applied to an input of the phase detector 5. As this does not require an operational amplifier this solution is particularly cheap. A further possibility of determining the phase of the current through the piezoelectric drive 1 is provided by the measurement circuit shown in FIG. 6. The circuit includes an anti-parallel arrangement of diodes 15. The current flows through this anti-parallel arrangement and produces a voltage drop. This small voltage drop is applied to the first input of the phase detector 5 via a difference amplifier, which is again an operational amplifier in the simplest case.

The phase thus measured for the current through the piezoelectric drive 1 together with the phase of the voltage applied to the piezoelectric drive 1 and determined by means of a measurement circuit (13) may be applied directly to a phase detector 5. This is the case in the circuit shown in FIG. 3. In the circuits shown in FIGS. 1 and 2 the voltage of the piezoelectric drive 1 is not applied directly to the phase detector 5 but the output voltage appearing on an output of a logic circuit 10 is used. In this case, the phase difference with the actual phase of the voltage applied to the piezoelectric drive 1 should be considered and corrected in dependence on the frequency, the load of the drive and the specific design of the circuit. The function of the logic circuit 10 is to control a bridge circuit, not shown, in the final stage 2, by means of which the voltage applied to the piezoelectric drive 1 can be varied in amplitude and frequency.

The output of the phase detector 5 is processed in a control loop of a loop filter 7. The loop filter 7 comprises passive components such as resistors and capacitors, for which the pole points and zero points of the transfer function of the loop filter 7 should be adapted to the relevant circuit. The output of the loop filter 7 controls the voltage-controlled oscillator 6 and the logic circuit 10, which follows said oscillator.

In order to obtain the optimum efficiency of the piezoelectric drive 1, for which the operating point lies below or above a phase difference of 0 degrees between the two input signals of the phase detector 5, the circuits shown in FIGS. 1 to 3 include a delay element 8. This delay element may be included between the measurement circuit 4 and the first input of the phase detector 5, as in FIG. 1, or between the one output of the logic circuit 10, a frequency divider, if any, and the second input of the phase detector 5, as in FIG. 2. In the circuit shown in FIG. 3 the delay element 8 is disposed between the second measurement circuit 13 and the second input of the phase detector 5. The delay element 8 provides the desired offset from the phase zero crossing. This offset has proved to be the operating point for an optimum efficiency of the piezoelectric drive 1.

In order to preclude harmonic distortion it is useful to operate the final stage 2 with a frequency which is several times, for example 6 times, as high as the frequency of the drive 1. In this case, a frequency divider 9 must be provided in the coupling branch between the one output of the logic circuit 10 and the second input of the phase detector 5. The frequency divider 9 is not required if the final stage 2 operates at the normal operating frequency of the piezoelectric drive 1.

Since the circuit in accordance with the invention raises the efficiency of the piezoelectric drive 1 the operating voltage applied to the piezoelectric drive 1 can be reduced. At the same time, the piezoelectric drive 1 consumes less current. These two features mean a more favorable power consumption in the case of the same mechanical load, as a result of which the circuit in accordance with the invention is particularly suitable for mains-independent electrical appliances such as, for example, electric shavers, because a lower power consumption allows the use of smaller and lighter accumulator batteries, as a result of which the shaver is easier to handle. Alternatively, if desired, the attainable shaving time may be prolonged when the battery capacity remains the same. FIG. 8 diagrammatically shows a circuit in accordance with the invention integrated in a shaver.

What is claimed is:

1. A circuit for the control of a piezoelectric drive (1), characterized in that an output signal of a first measurement circuit (4) is applied to a first input of a phase detector (5), an output signal of a logic circuit (10) or an output signal of a second measurement circuit (13) is applied to a second input of the phase detector (5), a second output signal of the logic circuit (10) is applied as an input signal to a final stage (2) which serves to supply an alternating voltage to the piezoelectric drive (1), a loop filter (7) processes the output signal of the phase detector (5) and supplies a control signal to a voltage-controlled oscillator (6), whose output signal is supplied to the input of the logic circuit (10), and a delay element (8) has been provided to adjust the frequency of the optimum operating point and efficiency of the controlled piezoelectric drive (1).

2. A circuit as claimed in claim 1, characterized in that the voltage is detected in the measurement circuit (4) by means of a sensor electrode (14) on the piezoelectric drive (1) and is the first input signal of the phase detector (5).

3. A circuit as claimed in claim 1, characterized in that in the measurement circuit (4) the current of the piezoelectric drive (1) flows through a measurement impedance (12) and the amplified voltage across the measurement impedance is the first input signal of the phase detector (5).

4. A circuit as claimed in claim 1, characterized in that in the measurement circuit (4) the current of the piezoelectric drive (1) flows through a zener diode (11) and the voltage across the zener diode (11) is the first input signal of the phase detector (5).

5. A circuit as claimed in claim 1, characterized in that in the measurement circuit (4) the current of the piezoelectric drive (1) flows through two diodes (15) arranged in anti-parallel and the amplified voltage across the diodes (15) is the first input signal of the phase detector (5).

6. A circuit as claimed in claim 1, characterized in that in the measurement circuit (13) the voltage applied to the piezoelectric drive (1) is measured.

7. A circuit as claimed in claim 1, characterized in that the delay element (8) delays the output signal of the measurement circuit (4).

8. A circuit as claimed in claim 1, characterized in that the delay element (8) delays the output signal of the logic circuit (10) in the branch between the logic circuit (10) and the second input of the phase detector (5), or the output signal of the measurement circuit (13).

9. A circuit as claimed in claim 1, characterized in that a frequency divider (9) is included in the branch between the one output of the logic circuit (10) and the second input of the phase detector (5).

10. A circuit as claimed in claim 1, characterized in that a frequency divider (9) followed by a delay element (8) is included in the branch between the one output of the logic circuit (10) and the second input of the phase detector (5).

11. An electrically powered shaver having an electric motor and means for controlling the electric motor, characterized in that the motor is a piezoelectric drive (1) and the means for controlling the motor is a circuit as claimed in any one of the claims 1 to 10.

* * * * *